United States Patent Office 2,908,852
Patented Oct. 13, 1959

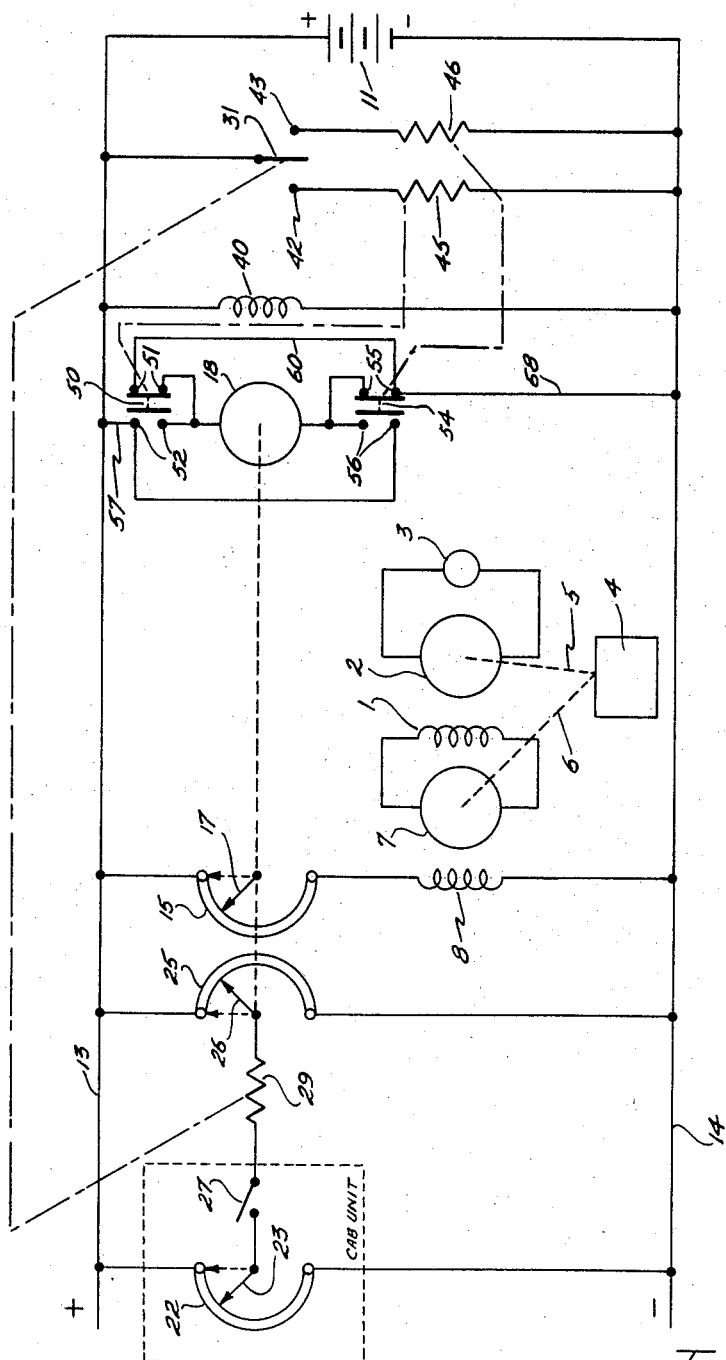

2,908,852
MULTIPLE UNIT HUMP CONTROL

Robert M. Henderson, Williams Bay, Wis., assignor to Fairbanks, Morse & Co., Chicago, Ill., a corporation of Illinois Application September 10, 1956, Serial No. 608,958

1 Claim. (Cl. 318—158)

This invention concerns electric power driven self-propelled vehicles and more particularly to an improved speed control circuit for such vehicles.

In the operation of self-propelled diesel-electric locomotives it is desirable to provide maximum tractive effort with full engine r.p.m. at very low train speeds. The usual power control system for such locomotives utilizes a throttle having a number of positions which control the speed of the locomotive in discrete steps. At times, however, it is desirable to adjust the speed of the locomotive at rates different from any of the discrete steps and in a continuously variable manner. Particularly, in freight operation it is necessary to adjust the locomotive speed to a rate of about two to four miles per hour. The close regulation of locomotive speed is not achievable with the more coarse throttle settings without continuous adjustment by the operator.

In general, a diesel-electric locomotive is driven by the current applied to traction motors from a main generator. The main generator comprises an armature driven directly by the diesel engine and a main generator shunt field winding coupled to the output of a separate exciter. The output current of the exciter is controlled by the action of the throttle in discrete steps and is not capable of the requisite fine control for humping operations.

In the case of freight humping operation, the currents in the traction motors are frequently in excess of those normally held in road operation and damage may result to these motors, because the traction motor blowers for cooling the traction motors operate at a speed proportional to engine speed and cannot deliver enough cooling effect to prevent motor burnout.

It is an object of this invention to provide a simple and economical speed control circuit for continuously variable and smooth operation of a diesel-electric locomotive at low speeds.

It is a further object of this invention to provide an improved speed control circuit which permits full engine speed for generating a maximum of cooling effect for traction motors while yet permitting operation of a diesel-electric locomotive at low speeds.

These and other objects and advantages of the invention will become apparent to those skilled in the art from a consideration of the embodiment illustrated in the accompanying drawing, comprising a single figure.

Referring now to the drawing, the single figure of which shows a control circuit for altering the current through the separately excited shunt field winding 1 of a main generator 2, whose output circuit is connected to a plurality of traction motors, only one of which is shown at 3. A prime mover 4, preferably a diesel engine, is connected over appropriate mechanical gearing or linkage 5 to the armature of generator 2. A separate exciter 7 having a field winding 8 has its output circuit connected to the shunt field winding 1 of generator 2. The exciter 7 may be driven by prime mover 4 over a linkage 6 in the same manner as generator 2.

The specific throttle circuit forms no part of the present invention and for simplicity and clarity it has been omitted from the drawings.

The conventional battery circuit 11 having positive and negative poles is connected to common conductors 13 and 14. Exciter field winding 8 is connected across conductors 13 and 14 in series with humping field rheostat 15. Thus, the amount of current flowing through exciter field winding 8 and hence, the amount of exciter output current to generator field winding 1, varies as a function of the resistance introduced into this circuit by rheostat 15. Rheostat 15 has a commutating arm 17 which is mechanically linked to a control motor 18.

A control rheostat 22 having commutating arm 23 is connected between conductors 13 and 14. A follower rheostat 25 having a commutating arm 26 is also connected between conductors 13 and 14. Commutating arm 26 is coupled to the shaft of reversible motor 18 and its position is controlled thereby. The series combination of a start switch 27 and the winding of a polarized relay 29 is connected between commutating arm 23 and commutating arm 26. Polarized relay 29 controls the movement of an armature 31. The direction of current through polarized relay 29 determines the direction of rotation of the shaft of motor 18.

Motor 18 has a field winding 40 connected between the positive and negative poles of battery 11. Armature 31 of polarized relay 29 is connected to the positive pole of battery 11 and is arranged to close contacts 42 or 43 to energize one of the parallel connected relay coils 45 or 46 respectively in accordance with the direction of flow of current through polarized relay 29. Relay windings 45 and 46 are connected between contacts 42 and 43 respectively and the negative pole of battery 11.

Relay 45 controls the movement of armature 50 which when relay 45 is de-energized closes contacts 51 (as shown) and when relay 45 is energized is moved to the left to close contacts 52. Relay 46 controls the movement of armature 54 which when relay 46 is de-energized (as shown) closes contacts 55 and when relay 46 is energized is moved to the left to close contacts 56.

The armature winding of motor 18 is selectively connectible to battery 11 so that it will rotate in either a clockwise or counterclockwise manner. If relay 45 is energized, armature 50 closes contacts 52 to connect an energizing circuit for the armature winding of motor 18 over a circuit extending from the positive pole of battery 11 over conductor 57, contacts 52, the armature winding of motor 18, contacts 55 and conductor 58 to the negative pole of battery 11. If relay 46 is energized, armature 54 closes contacts 56 to connect an energizing circuit for the armature winding of motor 18 over a circuit extending from the positive pole of battery 11, over conductor 57, contacts 56, the armature winding of motor 18, contacts 51, conductor 60, and conductor 58 to the negative pole of battery 11. Thus, the direction of current through the armature of motor 18 and the direction of rotation of the motor shaft is dependent upon which of relays 45 or 46 is energized.

The system is arranged so that upon the de-energization of both relay 45 and 46 a short circuit from one side of the armature winding of motor 18 over contacts 51, conductor 60 and contacts 55 to the other side of the armature winding is established to quickly brake the motor rotation and immediately stop the movement of commutating arms 17 and 26 to provide more accurate control of the speed regulating system.

In operation, if the engineman desires to alter the current output to the traction motor 3, he closes switch 27. At this time it is assumed that commutating arms 17, 23, and 26 of rheostats 15, 22 and 25, respectively, are at their topmost positions (shown by dashed lines). In this condition the resistance of rheostat 15 is completely shorted by commutating arm 17 and full voltage from battery 11 is applied to exciter field winding 8.

After switch 27 has been closed, the engineman by means of a control lever (not shown) manually changes the position of commutating arm 23 of control rheostat 22. Control rheostat 23 now acts as a voltage divider and only a portion of the full battery voltage appears between commutating arm 23 and battery negative. Since commutating arm 26 has not moved from its initial position the full battery voltage appears thereat. It is thus seen that a drop in potential occurs across polarized relay 29. The resultant current flow causes polarized relay 29 to move its armature 31 in a direction so as to close contacts 42 and complete the energizing circuit for relay 45. Relay 45 operates and moves armature 50 to the left to close contacts 52 and complete an energizing circuit for the armature winding of motor 18 over the previously described circuit. The current through the armature winding causes the control motor 18 to rotate in a direction such as to move commutating arm 17 of rheostat 15 in a counterclockwise direction and commutating arm 26 of rheostat 25 in a clockwise direction. Until commutating arm 26 of rheostat 25 reaches a position at which it produces a voltage with respect to battery negative equal to the voltage with respect to battery negative produced by commutating arm 23 of rheostat 22, current continues to flow in polarized relay 29 and the control motor energizing circuit remains closed.

When the commutating arm 26 of rheostat 25 reaches a position such that the voltage across polarized relay 29 is zero by virtue of the equal voltages between commutating arm 23 and battery negative and commutating arm 26 and battery negative, polarized relay 29 releases and armature 31 moves to a neutral position, breaking the circuit for relay 45 at contacts 42. De-energization of relay 45 causes movement of armature 50 to the right to break the energizing circuit for the armature winding of motor 18 and to complete a short circuit across said armature winding. Motor 18 ceases further movement and commutating arm 26 is held at its new position.

It will be recalled that commutating arm 17 of rheostat 15 is also connected to the shaft of motor 18 and it is moved counterclockwise simultaneously with movement of commutating arm 26. As commutating arm 17 moves, the voltage applied to exciter field winding 8 is reduced. The decrease in voltage produces a decrease in current in this winding and hence in the field flux of exciter 7. The reduction in field flux is reflected by a decrease in the current in shunt winding 1 of generator 2, resulting in a decrease in field flux in this generator and a reduction in the amount of current applied to traction motor 3.

It is thus seen that a smooth and continuous control action is available for controlling traction motor 3 over a limited range of speeds.

Additional movement of the manual lever coupled to commutating arm 23 in a counterclockwise manner results in a further decrease in the current applied to traction motor 3, in the same manner.

If after commutating arm 23 has been moved to a position of decreased current output from generator 3, it is desirable to increase the speed of the locomotive and hence, the speed of the traction motor 3, commutating arm 23 is manually rotated clockwise. This clockwise rotation increases the voltage drop between commutating arm 23 and battery negative. This increased voltage exceeds the commutating arm 26 to battery negative voltage, and current flows through polarized relay 29 in a direction opposite from that previously flowing. Polarized relay 29 effects movement of armature 31 to the right to close contacts 43 and complete the energizing circuit for relay 46. Relay 46 operates and moves armature 54 to the left to close contacts 56 and complete an energizing circuit for the armature winding of motor 18 over the previously described circuit. The current through the armature winding causes the control motor to rotate in a direction such as to move commutating arm 17 of rheostat 15 in a clockwise direction and commutating arm 26 of rheostat 25 in a counterclockwise direction.

The counterclockwise movement of commutating arm 26 effects an increase in the voltage drop between that commutating arm and battery negative. The counterclockwise rotation of wiper 26 continues until the voltage drop across polarized relay 29 is zero and relay 29 releases armature 31 to its central or neutral position. Armature 31 opens the energizing circuit for relay 46 at contacts 43 and motor 18 ceases movement.

It will be recalled that commutating arm 17 of rheostat 15 is connected to the shaft of motor 18 and it was moved in a clockwise direction to increase the voltage across exciter field coil 8. This increase in voltage is reflected, in the manner previously discussed, in an increase in traction current to traction motor 3 and hence, an increase in traction effort to increase the speed of the locomotive.

The invention, therefore, comprises a simple speed control system for providing a continuously variable means for effecting speed control of diesel-electric locomotives.

While a particular embodiment of the present invention has been illustrated and described, it is evident that other modifications, changes and rearrangements will occur to those skilled in the art without departing from the scope of the appended claim.

I claim:

A speed control system for a traction motor of a locomotive with a diesel engine power plant comprising a main generator with a shunt field winding driven by the diesel engine for delivery of current to the traction motor, an exciter generator with a shunt field winding driven by the diesel engine and controlling the excitation of the shunt winding of the main generator and thereby the effective delivery of current by the main generator to the traction motor, variable resistance means series connected with said exciter generator shunt field winding, said series connected resistance and field winding being connected across the terminals of a battery, a reversible direct current control motor to automatically adjust the variable resistance and hence the voltage across the exciter generator shunt field winding, said control motor including a selectively connectable armature winding, a first manually adjustable variable resistance connected across the battery for developing selective voltage levels, a second automatically adjusted variable resistance connected across said battery in parallel relationship to said first resistance and to the series connected resistance and exciter field winding, and control means comprising a polarized relay connected between said first and second variable resistances and operably responsive to voltage differences between said resistances, said polarized relay including an armature for establishing a first electrical circuit when said voltage across the first variable resistance exceeds the voltage across the second variable resistance, for establishing a second electrical circuit when the voltage across the second variable resistance exceeds the voltage across the first variable resistance, and for establishing a third electrical circuit when the voltages across the said first and second variable resistances are equal, the armature winding of the control motor being alternately connected in each said first and second electrical circuits for causing rotation of said motor in a direction determined by the control means for reducing the difference voltage between said first and second variable resistances to zero, and connectible alternatively in said third electrical circuit, said third electrical circuit forming a direct short circuit across said armature winding, said control motor in reducing said difference voltage to zero simultaneously adjusting the resistance series connected with the exciter generator shunt field winding to effect a control of the traction motor speed.

References Cited in the file of this patent

UNITED STATES PATENTS

| | | |
|---|---|---|
| 1,852,575 | Howe | Apr. 5, 1932 |
| 2,471,075 | Montrose-Oster | May 24, 1949 |
| 2,616,013 | Greenlee | Oct. 28, 1952 |
| 2,629,846 | Montgomery et al. | Feb. 24, 1953 |
| 2,812,481 | Roosdorp | Nov. 5, 1957 |

FOREIGN PATENTS

| | | |
|---|---|---|
| 909,470 | Germany | Apr. 22, 1954 |